US007580448B2

(12) United States Patent  (10) Patent No.: US 7,580,448 B2
Narayan et al.  (45) Date of Patent: Aug. 25, 2009

(54) METHOD AND APPARATUS FOR CHANNEL AMPLITUDE ESTIMATION AND INTERFERENCE VECTOR CONSTRUCTION

(75) Inventors: Anand P. Narayan, Boulder, CO (US); Prashant Jain, Northglenn, CO (US)

(73) Assignee: TENSORCOMM, Inc, Greenwood Village, CO (US)

( * ) Notice: Subject to any disclaimer, the term of this patent is extended or adjusted under 35 U.S.C. 154(b) by 884 days.

(21) Appl. No.: 10/686,829

(22) Filed: Oct. 15, 2003

(65) Prior Publication Data

US 2004/0098433 A1 May 20, 2004

Related U.S. Application Data

(60) Provisional application No. 60/418,187, filed on Oct. 15, 2002.

(51) Int. Cl.
*H04B 1/00* (2006.01)
(52) U.S. Cl. .................................................. 375/148
(58) Field of Classification Search ................ 375/142, 375/143, 144, 148, 150, 152, 316, 343, 346, 375/349; 455/63.1, 114.2, 278.1, 296, 278; 708/410
See application file for complete search history.

(56) References Cited

U.S. PATENT DOCUMENTS

| 3,742,201 | A | 6/1973 | Groginsky |
| 4,088,955 | A | 5/1978 | Baghdady |
| 4,309,769 | A | 1/1982 | Taylor, Jr. |
| 4,359,738 | A | 11/1982 | Lewis |
| 4,601,046 | A | 7/1986 | Halpern |
| 4,665,401 | A | 5/1987 | Garrard et al. |
| 4,670,885 | A | 6/1987 | Parl et al. |
| 4,713,794 | A | 12/1987 | Byington et al. |

(Continued)

FOREIGN PATENT DOCUMENTS

DE 4201439 A1 7/1993

(Continued)

OTHER PUBLICATIONS

Mitra, et al., Adaptive Decorrelating Detectors for CDMA Systems, Accepted for Wireless Communications Journal, Accepted May 1995.

(Continued)

*Primary Examiner*—Sam K Ahn
(74) *Attorney, Agent, or Firm*—Anand P. Narayan

(57) ABSTRACT

The present invention is directed to an efficient method and apparatus for channel determination and interference vector construction in accordance with spread spectrum systems. Channel determination is performed using a first series of fast Walsh transform steps. The results of the first set of fast Walsh transform steps corresponding to valid communication system channels are compared to a threshold value. Results derived from the first set of fast Walsh transform steps are then passed through a second set of fast Walsh transform steps with the number of steps performed for a set of results determined by the symbol length associated with the channels from which the amplitude information was derived. The interference vectors thus obtained for each valid symbol length may then be combined to form a composite interference vector. The fast Walsh transform steps and other steps may be performed using shared hardware components or software modules.

21 Claims, 8 Drawing Sheets

U.S. PATENT DOCUMENTS

| | | |
|---|---|---|
| 4,780,885 A | 10/1988 | Paul et al. |
| 4,856,025 A | 8/1989 | Takai |
| 4,893,316 A | 1/1990 | Janc et al. |
| 4,922,506 A | 5/1990 | McCallister et al. |
| 4,933,639 A | 6/1990 | Barker |
| 4,965,732 A | 10/1990 | Roy, III et al. |
| 5,017,929 A | 5/1991 | Tsuda |
| 5,099,493 A | 3/1992 | Zeger et al. |
| 5,105,435 A | 4/1992 | Stilwell |
| 5,109,390 A | 4/1992 | Gilhousen et al. |
| 5,119,401 A | 6/1992 | Tsujimoto |
| 5,136,296 A | 8/1992 | Roettger et al. |
| 5,151,919 A | 9/1992 | Dent |
| 5,218,359 A | 6/1993 | Minamisono |
| 5,218,619 A * | 6/1993 | Dent ........................... 370/209 |
| 5,220,687 A | 6/1993 | Ichikawa et al. |
| 5,224,122 A | 6/1993 | Bruckert |
| 5,237,586 A | 8/1993 | Bottomley |
| 5,263,191 A | 11/1993 | Dickerson |
| 5,280,472 A | 1/1994 | Gilhousen et al. |
| 5,305,349 A | 4/1994 | Dent |
| 5,325,394 A | 6/1994 | Bruckert |
| 5,343,493 A | 8/1994 | Karimullah |
| 5,343,496 A | 8/1994 | Honig et al. |
| 5,347,535 A | 9/1994 | Karasawa et al. |
| 5,353,302 A | 10/1994 | Bi |
| 5,377,183 A | 12/1994 | Dent |
| 5,386,202 A | 1/1995 | Cochran et al. |
| 5,390,207 A | 2/1995 | Fenton et al. |
| 5,394,110 A | 2/1995 | Mizoguchi |
| 5,396,256 A | 3/1995 | Chiba et al. |
| 5,437,055 A | 7/1995 | Wheatley, III |
| 5,440,265 A | 8/1995 | Cochran et al. |
| 5,448,600 A | 9/1995 | Lucas |
| 5,481,570 A | 1/1996 | Winters |
| 5,506,865 A | 4/1996 | Weaver, Jr. |
| 5,513,176 A | 4/1996 | Dean et al. |
| 5,533,011 A | 7/1996 | Dean et al. |
| 5,553,098 A | 9/1996 | Cochran et al. |
| 5,602,833 A | 2/1997 | Zehavi |
| 5,644,592 A | 7/1997 | Divsalar |
| 5,736,964 A | 4/1998 | Ghosh et al. |
| 5,787,130 A | 7/1998 | Kotzin et al. |
| 5,844,521 A | 12/1998 | Stephens et al. |
| 5,859,613 A | 1/1999 | Otto |
| 5,872,540 A | 2/1999 | Casabona |
| 5,872,776 A | 2/1999 | Yang |
| 5,894,500 A | 4/1999 | Bruckert et al. |
| 5,926,761 A | 7/1999 | Reed et al. |
| 5,930,229 A | 7/1999 | Yoshida et al. |
| 5,953,369 A | 9/1999 | Suzuki |
| 5,978,413 A | 11/1999 | Bender |
| 5,995,499 A | 11/1999 | Hottinen et al. |
| 6,002,727 A | 12/1999 | Uesugi |
| 6,014,373 A | 1/2000 | Schilling et al. |
| 6,018,317 A | 1/2000 | Dogan et al. |
| 6,032,056 A | 2/2000 | Reudink |
| 6,088,383 A | 7/2000 | Suzuki et al. |
| 6,101,385 A | 8/2000 | Monte et al. |
| 6,104,712 A | 8/2000 | Robert et al. |
| 6,115,409 A | 9/2000 | Upadhyay et al. |
| 6,127,973 A | 10/2000 | Choi et al. |
| 6,131,013 A | 10/2000 | Bergstrom et al. |
| 6,137,788 A | 10/2000 | Sawahashi et al. |
| 6,141,332 A | 10/2000 | Lavean |
| 6,154,443 A | 11/2000 | Huang et al. |
| 6,157,685 A | 12/2000 | Tanaka et al. |
| 6,157,842 A | 12/2000 | Kaisson et al. |
| 6,157,847 A | 12/2000 | Buehrer et al. |
| 6,163,696 A | 12/2000 | Bi et al. |
| 6,166,690 A | 12/2000 | Lin et al. |
| 6,172,969 B1 | 1/2001 | Kawakami et al. |
| 6,173,008 B1 * | 1/2001 | Lee ........................... 375/148 |
| 6,175,587 B1 | 1/2001 | Madhow et al. |
| 6,192,067 B1 | 2/2001 | Toda et al. |
| 6,201,799 B1 | 3/2001 | Huang et al. |
| 6,215,812 B1 | 4/2001 | Young et al. |
| 6,219,376 B1 | 4/2001 | Zhodzishsky et al. |
| 6,222,828 B1 | 4/2001 | Ohlson et al. |
| 6,230,180 B1 | 5/2001 | Mohamed |
| 6,233,229 B1 | 5/2001 | Ranta et al. |
| 6,233,459 B1 | 5/2001 | Sullivan et al. |
| 6,240,124 B1 | 5/2001 | Wiedeman et al. |
| 6,252,535 B1 | 6/2001 | Kober et al. |
| 6,256,336 B1 | 7/2001 | Rademacher et al. |
| 6,259,688 B1 | 7/2001 | Schilling et al. |
| 6,263,208 B1 | 7/2001 | Chang et al. |
| 6,266,529 B1 | 7/2001 | Chheda |
| 6,275,186 B1 | 8/2001 | Kong |
| 6,278,726 B1 | 8/2001 | Mesecher et al. |
| 6,282,231 B1 | 8/2001 | Norman et al. |
| 6,282,233 B1 | 8/2001 | Yoshida |
| 6,285,316 B1 | 9/2001 | Nir et al. |
| 6,285,319 B1 | 9/2001 | Rose |
| 6,285,861 B1 | 9/2001 | Bonaccorso et al. |
| 6,295,311 B1 * | 9/2001 | Sun ........................... 375/147 |
| 6,301,289 B1 | 10/2001 | Bejjani et al. |
| 6,304,618 B1 | 10/2001 | Hafeez et al. |
| 6,308,072 B1 | 10/2001 | Labedz et al. |
| 6,310,704 B1 | 10/2001 | Dogan et al. |
| 6,317,453 B1 | 11/2001 | Chang |
| 6,321,090 B1 | 11/2001 | Soliman |
| 6,324,159 B1 | 11/2001 | Mennekens et al. |
| 6,327,471 B1 | 12/2001 | Song |
| 6,330,460 B1 | 12/2001 | Wong et al. |
| 6,333,947 B1 | 12/2001 | van Heeswyk et al. |
| 6,351,235 B1 | 2/2002 | Stilp |
| 6,351,642 B1 | 2/2002 | Corbett et al. |
| 6,359,874 B1 | 3/2002 | Dent |
| 6,362,760 B2 | 3/2002 | Kober et al. |
| 6,363,104 B1 | 3/2002 | Bottomley |
| 6,377,636 B1 | 4/2002 | Paulraj et al. |
| 6,380,879 B2 | 4/2002 | Kober et al. |
| 6,385,264 B1 | 5/2002 | Terasawa |
| 6,396,804 B2 | 5/2002 | Odenwalder |
| 6,404,760 B1 | 6/2002 | Holtzman et al. |
| 6,430,216 B1 | 8/2002 | Kober et al. |
| 6,459,693 B1 | 10/2002 | Park et al. |
| 6,501,788 B1 | 12/2002 | Wang |
| 6,515,980 B1 | 2/2003 | Bottomley |
| 6,570,909 B1 | 5/2003 | Kansakoski |
| 6,574,270 B1 | 6/2003 | Madkour |
| 6,580,771 B2 | 6/2003 | Kenney |
| 6,584,115 B1 | 6/2003 | Suzuki |
| 6,590,888 B1 | 7/2003 | Ohshima |
| 6,668,011 B1 * | 12/2003 | Li et al. ...................... 375/147 |
| 6,680,727 B2 | 1/2004 | Butler |
| 6,798,737 B1 | 9/2004 | Dabak |
| 6,801,565 B1 | 10/2004 | Bottomley |
| 2001/0003443 A1 | 6/2001 | Velazquez et al. |
| 2001/0020912 A1 | 9/2001 | Naruse et al. |
| 2001/0021646 A1 | 9/2001 | Antonucci et al. |
| 2001/0046266 A1 | 11/2001 | Rakib et al. |
| 2002/0001299 A1 | 1/2002 | Petch et al. |
| 2002/0051433 A1 | 5/2002 | Affes et al. |
| 2002/0172173 A1 | 11/2002 | Schilling et al. |
| 2002/0176488 A1 | 11/2002 | Kober et al. |
| 2002/0191676 A1 * | 12/2002 | O'Hagan ..................... 375/130 |
| 2003/0053526 A1 | 3/2003 | Reznik |

FOREIGN PATENT DOCUMENTS

| | | |
|---|---|---|
| DE | 4326843 A1 | 2/1995 |
| DE | 4343959 A1 | 6/1995 |

| | | |
|---|---|---|
| EP | 0558910 A1 | 1/1993 |
| EP | 0610989 A2 | 1/1994 |
| GB | 2280575 A | 2/1995 |
| JP | 2000-13360 A | 1/2000 |
| WO | WO 93/12590 | 6/1995 |

OTHER PUBLICATIONS

Schneider, Optimum Detection of Code Division Multiplexed Signals, IEEE Transactions on Aerospace and Electronic Systems, Jan. 1979, vol. AES-15 No. 1.

Mitra, et al., Adaptive Receiver Algorithms for Near-Far Resistant CDMA, IEEE Transactions of Communications, Apr. 1995.

Lupas, et al. Near-Far Resistance of Multiuser Detectors in Asynchronous Channels, IEEE Transactions on Communications, Apr. 1990, vol. 38, No. 4.

Lupas, et al., Linear Multiuser Detectors for Synchronous Code-Division Multiple-Access Channels, IEEE Transactions on Information Theory, Jan. 1989, vol. 35, No. 1.

Kohno, et al., Cancellation Techniques of Co-Channel Interference in Asynchronous Spread Spectrum Multiple Access Systems, May 1983, vol. J 56-A. No. 5.

Garg, et al., Wireless and Personal Communications Systems, 1996, pp. 79-151, Prentice Hall, Upper Saddle River, NJ, US.

Cheng, et al., Spread-Spectrum Code Acquisition in the Presence of Doppler Shift and Data Modulation, IEEE Transactions on Communications, Feb. 1990, vol. 38, No. 2.

Behrens et al., Parameter Estimation in the Presence of Low Rank Noise, pp. 341-344, Maple Press, 1988.

Best, Phase-Locked Loops—Design, Simulation, and Applications, pp. 251-287, McGraw-Hill, 1999.

Iltis, Multiuser Detection of Quasisynchronous CDMA Signals Using Linear Decorrelators, IEEE Transactions on Communications, Nov. 1996, vol. 44, No. 11.

Rappaport, Wireless Communications—Principles & Practice, 1996, pp. 518-533, Prentice Hall, Upper Saddle River, NJ, US.

Scharf, et al., Matched Subspace Detectors, IEEE Transactions on Signal Processing, Aug. 1994, vol. 42, No. 8.

Price et al., A Communication Technique for Multipath Channels, Proceedings to the IRE, 1958, vol. 46, The Institute of Radio Engineers, New York, NY, US.

Affes et al., Interference Subspace Rejection: A Framework for Multiuser Detection in Wideband CDMA, IEEE Journal on Selected Areas in Communications, Feb. 2002, vol. 20, No. 2.

Schlegel et al., Coded Asynchronous CDMA and Its Efficient Detection, IEEE Transactions on Information Theory, Nov. 1998, vol. 44, No. 7.

Xie et al., A family of Suboptimum Detectors for Coherent Multiuser Communications, IEEE Journal on Selected Areas in Communications, May 1990, vol. 8, No. 4.

Viterbi, Very Low Rate Convolutional Codes for Maximum Theoretical Performance of Spread Spectrum Multiple-Access Channels, IEEE Journal on Selected Areas in Communications, May 1990, vol. 8, No. 4.

Viterbi, CDMA—Principles of Spread Spectrum Communication, 1995, pp. 11-75 and 179-233, Addison-Wesley, Reading, MA, US.

Verdu, Mimimum Probability of Error for Asynchronous Gaussian Multiple-Access Channels, IEEE Transactions on Information Theory, Jan. 1986, vol. IT-32, No. 1.

Kaplan, Understanding GPS—Principles and Applications, 1996, pp. 83-236, Artech House, Norwood, MA, US.

Scharf, Statistical Signal Processing—Detection, Estimation, and Time Series Analysis, 1990, pp. 23-75 and 103-178, Addison-Wesly, Reading, MA, US.

Stimson, Introduction to Airborne Radar 2nd edition, 1998, pp. 163-176 and 473-491, SciTech Publishing, Mendham, NJ, US.

Behrens et al., Signal Processing Applications of Oblique Projection Operators, IEEE Transactions on Signal Processing, Jun. 1994, vol. 42, No. 6.

Alexander et al., A Linear Receiver for Coded Multiuser CDMA, IEEE Transactions on Communications, May 1997, vol. 45, No. 5.

Schlegel et al., Multiuser Projection Receivers, IEEE Journal on Selected Areas in Communications, Oct. 1996, vol. 14, No. 8.

Halper et al., Digital-to-Analog Conversion by Pulse-Count Modulation Methods, IEEE Transactions on Instrumentation and Measurement, Aug. 1996, vol. 45, No. 4.

Ortega et al., Analog to Digital and Digital to Analog Conversion Based on Stochastic Logic, IEEE 0-7803-3026-9/95,1995.

Frankel et al., High-performance photonic analogue digital converter, Electronic Letters, Dec. 4, 1997, vol. 33, No. 25.

Lin et al., Digital Filters for High Performance Audio Delta-sigma Analog-to-digital and Digital-to-analog Conversions, Proceedings of ICSP, Crystal Semiconductor Corporation, 1996, Austin, TX, US.

Thomas, Thesis for the Doctor of Philosophy Degree, UMI Dissertation Services, Jun. 1996, Ann Arbor, MI, US.

Schlegel et al., Projection Receiver: A New Efficient Multi-User Detector, IEEE, 1995, 0-7803-2509-5/95.

Behrens, Subspace Signal Processing in Structured Noise, UMI Dissertation Services, Jun. 1990, Ann Arbor, MI, US.

* cited by examiner

METHOD AND APPARATUS FOR CHANNEL AMPLITUDE ESTIMATION AND INTERFERENCE VECTOR CONSTRUCTION

CROSS-REFERENCE TO RELATED APPLICATIONS

This application claims the benefit of U.S. Provisional Application No. 60/418,187, entitled "Method for Channel Amplitude Estimation and Interference Vector Construction," filed Oct. 15, 2002, the entire disclosure of which is hereby incorporated by reference.

FIELD OF THE INVENTION

The present invention is directed to the determination of channel amplitude in a communication system. In addition, the present invention is directed to the construction of interference vectors for use in creating an interference canceled signal. More particularly, the present invention is directed to channel amplitude estimation and interference vector construction using complimentary methods and/or structures.

BACKGROUND OF THE INVENTION

Wireless communication systems should provide for a large number of secure (or private) communication channels within their allotted frequency space. In order to achieve these goals, spread spectrum systems have been developed. In a spread spectrum type system, spreading codes are used that allow multiple channels to occupy the same frequency range. In order to successfully demodulate a channel, the spreading code and covering code used in connection with the channel must be known. When a demodulation processor is tracking a particular single path, signal paths associated with other transmitters appear to that processor as noise.

In order to provide for reliable communications, spread spectrum systems typically track multiple signal paths in connection with establishing and maintaining a communication channel between a pair of end points. The different signal paths may result from redundant signals that are provided by additional base stations and base station sectors, or from reflected or multipath versions of signals. In a typical receiver, a number (e.g., 4-6) demodulation processors or fingers are provided, and each of these fingers is assigned to track a different signal path. In order to obtain information regarding the different signal paths that are available to a receiver, a searcher demodulation processor or finger is provided. In a typical receiver, the searcher finger detects and identifies signals by pseudo-random number (PN) code offsets and signal strength. Because signal paths other than the signal paths being tracked appear as noise to a demodulation processor, the signal to noise ratio with respect to a tracked or desired signal path can be low, which can result in a communication channel with poor quality and reliability. In particular, signals from sources that are in close proximity to the receiver can drown out signals from sources that are farther away from the receiver. Accordingly, because of this "near-far" problem, signal diversity is limited. In addition to leaving communication channels more vulnerable to interruption, relatively weak signals that might otherwise be available to a receiver may lie beneath the noise floor created by other relatively strong signals.

The encoded channels broadcast by a base station generally do not interfere with one another due to the orthogonality of the covering Walsh codes or the quasi-orthogonality of the covering quasi-orthogonal functions (QOF). However, a spread spectrum communication system, such as a direct sequence, code division multiple access (DS-CDMA) system is still subject to two forms of multiple access interference on the forward link. Co-channel interference consists of multipath copies of signal paths that are delayed in time with respect to a signal path of interest. Such signals can cause interference because the orthogonality of the Walsh covering codes is lost whenever a time offset exists between two codes. Specifically, when aligned, Walsh codes form an orthogonal basis, but there may be high cross correlations when they are not aligned. Cross channel interference occurs when a combination of transmissions from more than one base station sector or base station are received at the RF front end simultaneously. Each base station sector is distinguished by a unique PN short code offset. However, the sequence has minimal, but non-zero cross-correlation properties. This manifests itself as cross-correlation interference between signals originating from different base station sectors. As a result, a signal transmitted from another base station that is received at a much greater power level is capable of masking the signal of interest due to the non-zero cross-correlation of the short code and the unaligned Walsh codes.

Methods for removing interfering signal paths from received signal streams have been developed. For example, interference cancellation is a feature incorporated into many spread spectrum receivers designed for CDMA systems, such as the cdma2000 and W-CDMA standards for wireless communications. In particular, interference cancellation receivers are a class of spread spectrum communication system receivers that have the capability to remove or reduce the interference from an interfering source or sources. Most methods of interference cancellation require the estimation of channels in the interfering signal source. Accordingly, the identity of valid channels within a signal path and the amplitudes of those channels must be estimated. Other methods, which utilize projection based methods for interference calculation require the construction of an interference vector to represent the direction of the interference from active channels within an interfering signal source, but not necessarily the amplitude of those channels.

Spread spectrum communication systems were initially developed using symbols of a single length. For example, IS-95 systems use a 64 chip symbol length. However, more recent communication standards, such as cdma2000, have introduced shorter length codes (supplemental channels) that coexist with longer codes. For example, to facilitate high-speed data transmissions, communication systems that allow symbols that are as short as four chips long for data transmission, while at the same time allowing channels utilizing symbols that are 64 chips long or more for voice communications have been developed. The use of symbols of different lengths within a single communication system has complicated the task of identifying active channels in a signal path. In addition, because the use of shorter length codes invalidates certain families of longer length codes, existing methods for identifying active channels can be inefficient when applied to systems supporting the use of multiple symbol lengths.

The fast Walsh transform is a known method for efficiently calculating the amplitudes of multiple channels within a signal path. In particular, the fast Walsh transform method can be used to calculate the amplitudes of channels that are covered using an orthogonal family of codes known as Walsh codes. However, conventional methods for applying the fast Walsh transform process have not been capable of efficiently estimating channels in connection with communication systems that support multiple symbol lengths. In addition, conventional methods have been incapable of efficiently constructing an interference vector for interference cancellation.

SUMMARY OF THE INVENTION

The present invention is directed to solving these and other problems and disadvantages of the prior art. According to an embodiment of the present invention, a fast Walsh transform is applied to amplitude information concerning an interfering signal path. In particular, the amplitude information is at a resolution corresponding to each chip of data received in connection with tracking an interfering or potentially interfering signal paths. The amplitude data is then processed using a fast Walsh transform. The data may be passed through one or more fast Walsh transform levels to identify active channels. In particular, after processing of the data at a Walsh level corresponding to a valid symbol length for data transmitted by the interfering signal path, the amplitude of each element in the set of data for that stage is compared to a threshold value. If the magnitude of an element is greater than the threshold value, that element is replaced with a zero before the data set is subjected to a next stage of processing using the fast Walsh transform. Accordingly, the present invention provides a method and apparatus by which the presence and amplitude of valid channels within a signal path produced in connection with a communication system supporting multiple valid symbol lengths can be determined.

In accordance with another embodiment of the present invention, the results of performing a fast Walsh transform at each Walsh level corresponding to a valid symbol length are applied in forming a vector for use in creating an interference canceled signal stream. Accordingly, in an embodiment of the present invention, the results of performing a fast Walsh transform at a level corresponding to a valid channel symbol length are compared to a threshold value. Individual elements of the results at that level having a magnitude that is less than the threshold are replaced by a zero, while the amplitudes of elements that exceed the threshold are left unaltered. The results of this comparison may be stored in a register. For each register containing threshold data for use in constructing an interference vector, fast Walsh transform processing is applied. In particular, each set of data is passed through a number of fast Walsh transform levels corresponding to the level from which the magnitude data was originally obtained, resulting in the creation of an interference vector. In accordance with another embodiment of the present invention, where multiple symbol lengths are supported, interference vectors formed using data from fast Walsh transform levels corresponding to valid symbol lengths are combined to form a composite interference vector. In accordance with an embodiment of the present invention, a composite interference vector is found by combining scaled interference vectors corresponding to each valid signal length. In accordance with a further embodiment of the present invention, the scaling is performed to normalize the energies within the individual interference vectors.

In accordance with another embodiment of the present invention, the fast Walsh transform processes used in connection with channel estimation and interference vector construction are implemented using shared hardware components. That is, the same components used in connection with estimating channel amplitudes can be used for constructing interference vectors.

DETAILED DESCRIPTION

Figure 1:
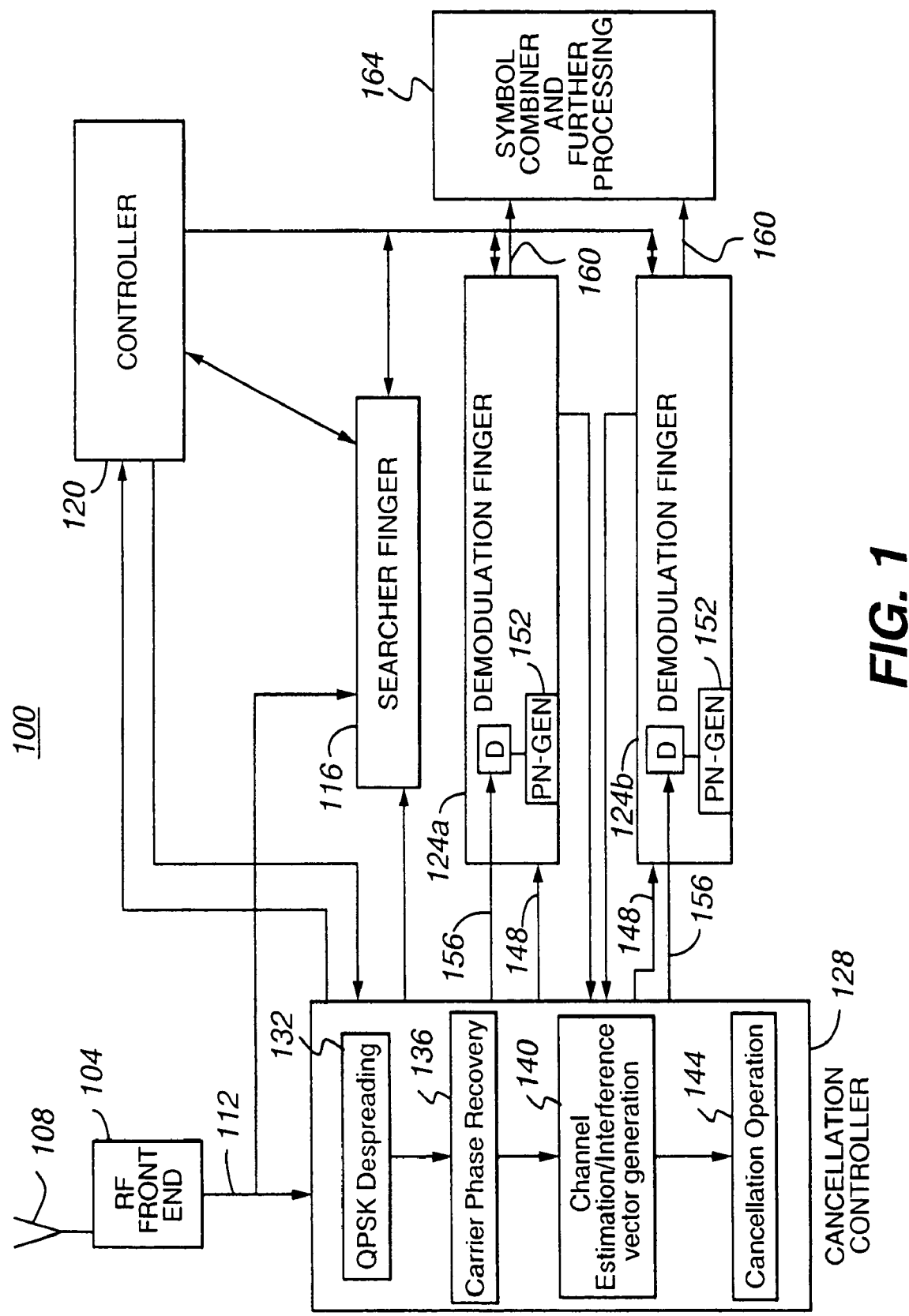
FIG. 1 is a block diagram depicting components of a spread spectrum receiver in accordance with an embodiment of the present invention.

With reference now to FIG. 1, an interference cancellation enabled receiver 100 in accordance with an embodiment of the present invention is illustrated. As depicted in FIG. 1, signals are provided to a radio frequency (RF) front end 104 by an antenna 108. In a typical environment, a number of different signals, for example, signals produced by different base stations, different sectors of a base station, or multipath or reflected versions of the signals can be received at the radio frequency (RF) front end 104. As can be appreciated by one of skill in the art, signals from different base stations or different sectors of a base station are typically identified by an associated path number or pseudo-random number (PN), which identifies the base station or base station and sector according to the time offset of the signal path in the PN code space. Multipath versions of signals are identified by the path number of the line of sight version of the signal, but with an additional time offset to account for the longer path followed by the reflected signal. As can further be appreciated by one of skill in the art, signal paths from different sources are typically separated by a distance (e.g., multiple of 64 chips) sufficient to allow multipath versions of signal paths to be correctly associated with their source.

The RF front end 104 down samples the radio frequency signal and separates the signal into a complex base band signal or raw signal stream 112 with in phase (I) and quadrature (Q) components. It will be recognized by those skilled in the art that the processing depicted and described in connection with the present disclosure includes both the I and Q channels, even when only one connection or signal path is depicted.

The raw signal stream 112 collected by the receiver 100 and down converted from the RF front end 104 is provided to a searcher finger 116. The searcher finger functions to scan the signal stream 112 for individually identifiable signal paths and/or multipaths. In particular, the searcher finger 116 operates to determine the path number or pseudo-random number (PN) code offset associated with each identifiable signal path. As noted above, the PN code identifies the signal path as being associated with a particular base station or base station sector. In code division multiple access (CDMA) systems, the PN code sequence is referred to as the short code.

The searcher finger 116 reports the signal paths that have been identified to a controller 120. The controller 120 may use the information provided from the searcher finger 116 to determine which signal paths to acquire and track. In general, the number of signal paths that a receiver 100 can be directed to track is limited by the number of demodulation fingers 124 provided as part of the receiver 100. In assigning a demodulation finger 124 to acquire and track a signal path, the controller 120 may provide information regarding the PN code offset, any additional time offset and the observed signal strength for the assigned signal path. In FIG. 1, only two demodulation fingers 124a and 124b are shown. However, it should be appreciated that any number of additional demodulation fingers 124 may be provided.

As shown in FIG. 1, the baseline controller 120 may be in communication with a cancellation controller 128. As will be described herein, the cancellation controller 128 is capable of estimating the amplitudes of individual channels within a signal path. In addition, embodiments of the cancellation controller 128 are capable of forming interference vectors. In accordance with other embodiments of the present invention, the cancellation controller 128 can combine multiple interference vectors to form a composite interference vector.

The cancellation controller 128 includes a number of modules. In particular, when the cancellation controller 128 determines that a signal path should be canceled, the PN code corresponding to that signal path, and the I and Q data in which the signal path is present, are fed into the quadrature phase shift key (QPSK) despreading module 132. After despreading, the carrier phase is recovered in the carrier phase recovery module 136. Carrier phase recovery may be made using a variety of methods. For example, carrier phase recovery may be performed as described in U.S. Pat. No. 7,068,706, filed Oct. 15, 2003, entitled "System and Method for Adjusting Phase", and U.S. Provisional Patent Application Ser. No. 60/418,188, entitled "Carrier Phase Recovery Circuit," filed Oct. 15, 2002, assigned to the assignee of the present invention, the entire disclosures of which are incorporated herein by reference. The PN stripped and phase stripped data stream obtained after carrier phase recovery is then provided to the channel estimation/interference vector generation module 140. The channel estimation/interference vector generation module 140 determines the amplitude of active channels in the signal paths to be cancelled, and produces an interference vector that may be provided to a cancellation operation module 144. The cancellation operation module 144 uses the interference vector provided by the channel estimation/interference vector generation module 140 to remove the identified interfering signal path from a signal stream or streams 148 provided to one or more demodulation fingers 124. A demodulation finger 124 receiving the interference canceled signal may then demodulate data transmitted by a channel of a desired signal path.

As illustrated in FIG. 1, the demodulation fingers 124 may each be provided with a PN generator 152. Furthermore, the PN code generated by a PN generator 152 may be advanced or delayed in response to a control signal 156 sent to the PN generator 152 by the cancellation controller 128. The ability to delay or advance the PN generators 152 associated with the demodulation fingers 124 is advantageous because it allows the demodulation fingers 124 to each track a provided feed signal stream, even if that feed signal stream has undergone delays, for example in processing in the cancellation controller 128 as part of the generation of an interference canceled signal stream. Alternatively or in addition, the cancellation controller may provide a demodulated signal to a delay buffer provided as part of the demodulation fingers 124 to control an amount of delay introduced by each demodulating finger 124 before a symbol obtained from a provided signal stream is released by the demodulation finger 124. By so controlling the delay within the demodulation fingers 124, demodulated signal streams 160 may be provided to a symbol combiner 164 that are synchronized with one another. Accordingly, a conventional symbol combiner 164 may be used. Alternatively, a symbol combiner 164 that is capable of synchronizing symbols obtained from the processing of provided signal streams 148 by demodulation fingers 124 may be used. As yet another alternative, the cancellation controller 128 may provide feed signal streams to demodulation fingers 124 after a fixed delay with respect to the raw signal stream 112 as it is received in the RF front end 104, so that a conventional symbol combiner 160 may be used. In general, any method may be used that provides synchronized data to the symbol combiner 164. As can be appreciated by one of skill in the art, the demodulation fingers and symbol combiner 164 may comprise a rake receiver.

Figure 2:
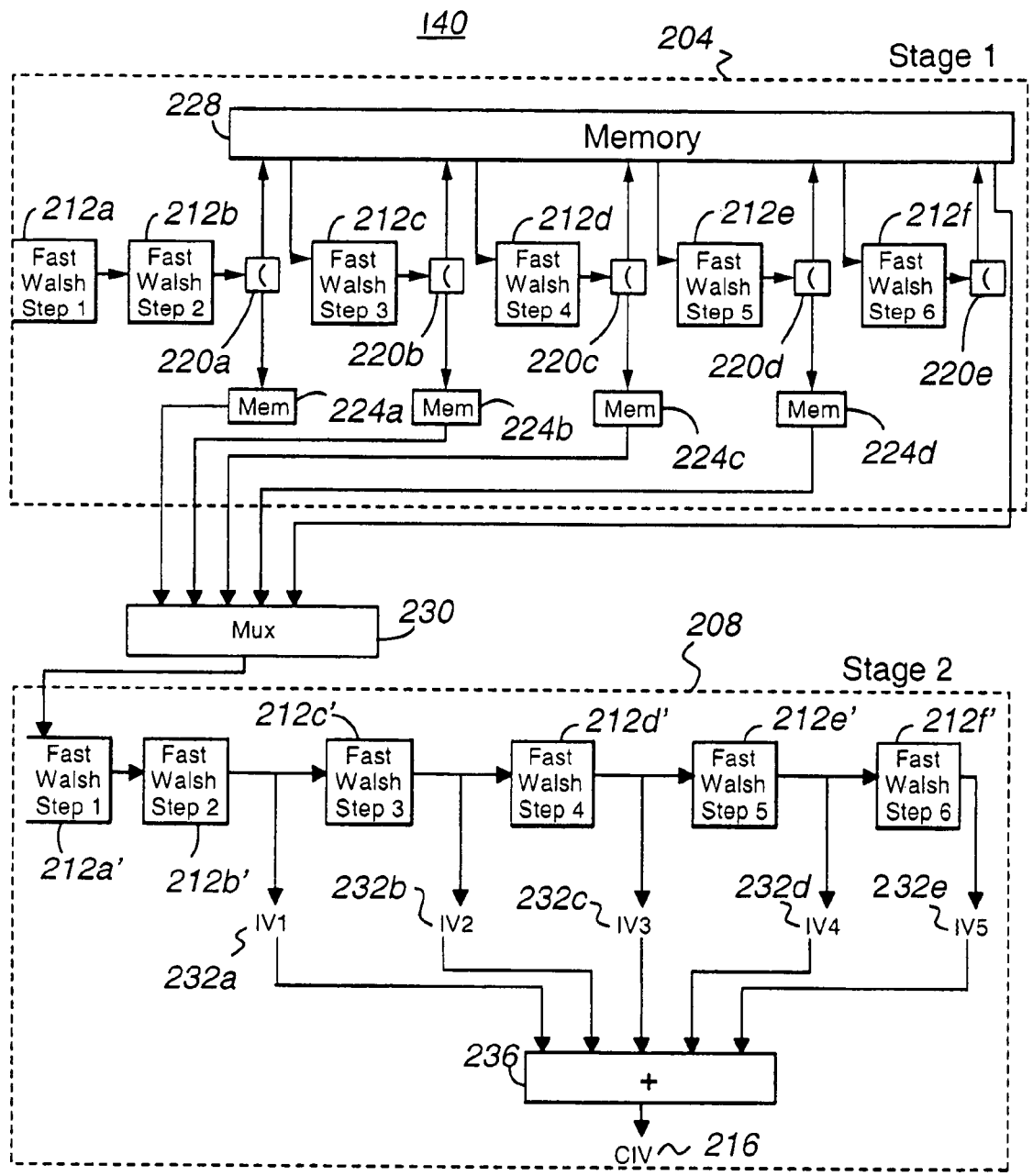
FIG. 2 is a block diagram depicting process steps and information flows in connection with components of a channel estimation and interference vector generation system in accordance with an embodiment of the present invention.

With reference now to FIG. 2, aspects of a cancellation controller 128 and in particular of a channel estimation/interference vector generation module 140 in accordance with an embodiment of the present invention are illustrated. As shown in FIG. 2, the channel estimation/interference vector generation module 140 may be considered as comprising first 204 and second 208 stages. In particular, the first stage 204 performs channel estimation functions, while the second stage 208 performs interference vector construction. Furthermore, as will be appreciated from the description provided herein, in stage one 204, information related to the magnitude of chips received as part of a signal path are subjected to a number of fast Walsh transform steps 212 to determine the presence of valid channels within the signal path identified as interfering, and the amplitudes of those channels. The number of fast Walsh transform steps 212 used to process the received data is equal to log N, where N is the number of valid channels. For example, in connection with a 64 channel communication system, 6 steps are needed to completely determine which channels are present in a signal path. As a further example, a 128 channel communication system would require 7 steps. The information regarding the amplitudes of the channels obtained by stage one 204 is used by stage two 208 to form a composite interference vector 216 for use by the cancellation operation module 144 to cancel the interfering signal path from a signal stream provided to a demodulation finger 124.

Accordingly, as illustrated, stage one 204 includes a number of fast Walsh transform steps 212. In the exemplary embodiment illustrated in FIG. 2, the receiver 100 is for use in connection with a communication system that supports 64 traffic channels within each signal path. Accordingly, the channel estimation/interference vector generation module 140 includes 6 fast Walsh transforms steps 212a-f. However, it should be appreciated that any number of fast Walsh transform steps 212 may be provided.

Initially, the despread carrier phase recovered received signal is passed through the first fast Walsh transform step 212a. In the present example, the described fast Walsh transform steps are performed on a set of data comprising an amplitude or magnitude for each chip within a segment of data having a length equal to the longest valid symbol length. Accordingly, in the present example, each fast Walsh transform step 212 is performed on a set of data containing 64 different magnitudes.

As can be appreciated by one of skill in the art, the first fast Walsh transform step comprises 64 addition or subtraction operations. More specifically, the first fast Walsh transform step 212a comprises adding the first element $a_1$ to the second element $a_2$ to obtain a new first element, subtracting the second element $a_2$ from the first element $a_1$ to obtain a new second element, adding the third element $a_3$ to the fourth element $a_4$, to obtain a new third element, subtracting the fourth element $a_4$ from the third element $a_3$ to obtain a new fourth element, and so on, until all 64 elements within the set have been processed and 64 new values calculated. In the present example, the communication system does not support symbols that are less than four chips long. Accordingly, the results of performing the first fast Walsh transform step or circuit 212a are passed directly to the second fast Walsh transform step 212b As can also be appreciated by one of skill in the art, in the second fast Walsh transform step 212b, there are also 64 additions or subtractions. The calculations included in the second fast Walsh transform step 212b are performed on the 64 magnitudes or elements resulting from the first Walsh transform step 212a. In particular, the first element $a_1$ is added to the third element $a_3$ to obtain a new first element, the third element $a_3$ is subtracted from the first element $a_1$ to obtain a new second element, the second element $a_2$ is added to the fourth element $a_4$ to obtain a new third element, the fourth element $a_4$ is subtracted from the second element $a_2$ to obtain a new fourth element, and so on, until each element within the set has been included in one addition, and one subtraction calculation as part of the second fast Walsh transform stage 212b and a new value has been calculated for each included element.

In the present example, the communication system supports symbols having a length as short as four chips. The minimum length of a valid symbol used in connection with a communication system is known from the standards, and therefore is typically preconfigured for a given receiver 100. Alternatively, such information may be provided by a base station or other network component in communication with a receiver 100. Because in the present example symbols as short as four chips can be used by a channel, and because any such channels can be determined after two fast Walsh transform steps, the magnitudes obtained following the two fast Walsh transform steps are considered. In particular, each element within the set of calculated values or magnitudes is compared to a threshold value in a first comparator or comparison block 220a. The threshold against which channel strengths are tested in connection with channel determination may be equal to or derived from a magnitude of a channel that is known to be present as part of the interfering signal paths. For example, the average magnitude of a received channel that, according to the applicable standards is always present in a signal path may be used to set the threshold value. The threshold may also be set to a preselected value or to a fixed value if a criteria for the magnitude for a channel that is present is developed.

Following the comparison, magnitudes within the set of values that are found to be equal to or greater than (or, alternatively, greater than) the threshold magnitude are stored in a first memory block 224a. Zero values are entered or stored in the first memory block 224a for those elements that are less than (or, alternatively, not greater than) the threshold magnitude. The values (i.e., channel amplitudes) stored in first memory block 224a are related to an active channel or channels using symbols that are four chips long to transmit data. Furthermore, as described herein, the values stored in the memory blocks 224 provided as part of stage one 204 of the channel estimation/interference vector generation module 140 comprise an interference vector precursor, and will be used in stage two 208 to calculate the interference vector. The elements or channel amplitudes determined in the first comparison block 220a to be lower than (or, alternatively, less than or equal to) the threshold are stored in memory block 228 as a channel estimate. Zero values are entered or stored in memory block 228 for those elements that are equal to or greater than (or, alternatively, greater than) the threshold magnitude. Accordingly, as will be appreciated from the present disclosure, the channel estimation/interference vector generation module 140 will be prevented from creating interference vectors for invalid, longer length channels. That is, an interference vector would not be created that includes or accounts for channels using four longer length symbols that are invalidated by the use of a shorter length (e.g., four chip) symbol.

The values comprising stored magnitudes or zero values following the first comparison step 220a stored in memory 228 are then provided to the third fast Walsh transform step 212c. As can be appreciated by one of skill in the art, as part of the third fast Walsh transform step 212c, the first element $a_1$ is added to the fifth element $a_5$ to obtain a new first element, the fifth element $a_5$ is subtracted from the first element $a_1$ to obtain a new second element, the second element $a_2$ is added to the sixth element $a_6$ to obtain a new third element, the sixth element $a_6$ is subtracted from the second element $a_2$ to obtain a new fourth element, and so on, until each of the magnitudes within the set have been included in one addition and one subtraction operation and a new magnitude has been calculated for each element.

The results of the third fast Walsh transform step 212c are then compared to the threshold at a second comparison step 220b. Each magnitude within the results of the third fast Walsh transform that is greater than or equal to the threshold as stored in a second memory block 224b. Zero values are stored in memory block 224b for those elements (i.e., those magnitudes) having a magnitude that is not greater than or equal to the threshold. Element magnitudes that are less than the threshold are stored in the memory block 228, and zero values are stored in the memory block 228 for elements having a magnitude that is greater than the threshold. The value stored in the memory block 228 after the second comparison step 220b may replace the element magnitudes or values stored in the memory block 228 following the previous or first comparison step 228.

The values comprising stored magnitudes or zero values following the second comparison step 220b are then provided to the fourth fast Walsh transform step 212d. As can be appreciated by one of skill in the art, as part of the fourth fast Walsh transform step 212d, the first element $a_1$ is added to the ninth element $a_9$ to obtain a new first element, the ninth element $a_9$ is subtracted from the first element $a_1$ to obtain a new second element, the second element $a_2$ is added to the tenth element $a_{10}$ to obtain a new third element, the tenth element $a_{10}$ is subtracted from the second element $a_2$ to obtain a new fourth element, and so on, until each of the magnitudes within the set have been included in one addition and one subtraction operation and a new magnitude has been calculated for each element.

The results of the fourth fast Walsh transform step 212d are then compared to the threshold at a third comparison step 220c. Each magnitude that is greater than or equal to the threshold is stored in a third memory block 224c. Zero values are stored in memory block 224c for those elements having a magnitude that is not greater than or equal to the threshold. Element magnitudes that are less than the threshold are stored in the memory block 228, and zero values are stored in the memory block 228 for elements having a magnitude that is greater than the threshold. The values stored in the memory block 228 after the third comparison step 220c may replace the element magnitudes or values stored in the memory block 228 following the second comparison step 220b.

The values stored in the memory block 228 following the fourth fast Walsh transform step 212d and the third comparison step 224c are then provided to the fifth fast Walsh transform step 212e for processing. As can be appreciated by one of skill in the art, the fifth fast Walsh transform step 212e, comprises adding the first element $a_1$ to the seventeenth element $a_{17}$ to obtain a new first element, subtracting the seventeenth element $a_{17}$ from the first element $a_1$ to obtain a new second element, adding the second element $a_2$ to the eighteenth element $a_{18}$ to obtain a new third element, subtracting the eighteenth element $a_{18}$ from the second element $a_2$ to obtain a new fourth element, and so on, until each of the elements has been included in one addition and one subtraction operation, and a new magnitude has been calculated for each of the elements.

The results of performing the fifth fast Walsh transform step 212e are then compared to the threshold value in a fourth comparison step 220d. Elements with amplitudes that are equal to or greater than the threshold are stored in memory block 224d, while amplitudes for elements that are lower than the threshold are changed to zero in memory block 224d. The values of element amplitudes that are less than the threshold are stored in memory block 228, while elements having amplitudes that are equal to or exceed the threshold are stored in the memory block 228 with a value of zero.

The values stored in memory block 228 following the fifth fast Walsh transform step 212e and the fourth comparison step 220d are then provided to the sixth fast Walsh transform step 212f for processing. As can be appreciated by one of skill in the art, the sixth fast Walsh transform step 212f comprises adding the first element $a_1$ to the thirty-third element $a_{33}$ to obtain a new first element, subtracting the thirty-third element $a_{33}$ from the first element $a_1$ to obtain a new second element, adding the second element $a_2$ to the thirty-fourth element $a_{34}$ to obtain a new third element, subtracting the thirty-forth element $a_{34}$ from the second element $a_2$ to obtain a new fourth element, and so on, until each of the elements has been included in one addition and one subtraction operation, and a new magnitude has been calculated for each of the elements.

The results of performing the sixth fast Walsh transform step 212f are then compared to the threshold in a fifth comparison step 220e. In accordance with the embodiment illustrated in FIG. 2, elements having a magnitude that is greater than or equal to the threshold are stored as a set in memory block 228 in which elements that have magnitudes less than the threshold are changed to zero. In particular, because in the present example the sixth fast Walsh transform step 212f is the last to be performed (i.e., the longest valid symbol length for this example is 64), the memory block 228 that was used to store values for use in connection with a next step of fast Walsh transform processing can instead be used to store data for use in constructing an interference vector.

Following the completion of the channel determination steps included as part of stage one 204, amplitude information collected in connection with valid channels can be selectively provided to stage two 208 for construction of a composite interference vector 216. In particular, a multiplexer 230 may provide channel amplitude data from a selected one of the memory blocks 224, 228. The amplitude data is then processed using the number of fast Walsh transform steps corresponding to the level from which the amplitude information was obtained.

Accordingly, the amplitude information with respect to the magnitudes stored in the first memory block 224a are provided to first fast Walsh transform step or circuit 212a' and second fast Walsh transform step 212b'. The first 212a' and second 212b' fast Walsh transform steps may be performed using the same componentry as was used in connection with performing the first fast Walsh transform step 212a and second fast Walsh transform step 212b as part of the stage one 204 processing. Because the data stored in block 224a is related to channels using symbols of length four, that data is only processed by fast Walsh transform steps one 212a' and two 212b'. The results obtained after the second fast Walsh transform step 212b' has been performed on the data from memory block 224a is stored as interference vector one (IV1) 228a, for example in first memory block 224a.

The multiplexer 230 may next be operated to provide the magnitudes stored in the second memory 224b to the second stage 208. The set of magnitudes or values stored in the second memory 224b were passed through three steps or levels of fast Walsh processing 212. Accordingly, in stage two 208 these values will be passed through three fast Walsh transform steps: fast Walsh transform step one 212a', fast Walsh transform step two 212b', and fast Walsh transform step three 212c'. The results obtained after performing the third step of fast Walsh processing 212c' may then be stored as interference vector two (IV2) 232b, for example in the second memory block 224b.

The data stored in memory block 224c is processed by passing that data through four fast Walsh transform steps 212a'-d'. The results of that processing are stored as interference vector 3 (IV3) 232c, for example in memory 224c.

Data stored in memory block 224d is processed by passing that data through five fast Walsh transform sets 212a'-e'. The results of that processing are stored as interference vector 4 (IV4) 232d, for example in memory block 224d.

The data that was stored in memory block 228 following the sixth step of fast Walsh transform processing 212f and the fifth comparison step 220e may then be provided to the second stage 208 by the multiplexer 230. The data is passed through six fast Walsh transform steps 212a'-f', and stored, for example in memory 228 as interference vector 5 (IV5) 232e.

The individual interference vectors 232a-e may then be added in summation block 236 to form the composite interference vector 216. In accordance with the embodiment of the present invention, each of the interference vectors 232 is scaled. In particular, each interference vector 232 is multiplied by a value such that the amount of energy represented by the set of magnitudes included in each of the interference vectors 232 is normalized. Accordingly, the first interference vector 232a may be multiplied by sixteen to obtain a first scaled interference vector, the second interference vector 232b is multiplied by eight to obtain a second scaled interference vector, the third interference vector 232c is multiplied by four to obtain a third scaled interference vector, the fourth interference vector 232d is multiplied by two to obtain a fourth scaled interference vector, and the fifth interference vector 232e is multiplied by one obtain a fifth scaled interference vector. These scaled interference vectors are then added together to obtain the composite interference vector 216.

As can be appreciated from the description provided herein, various processes are repeated in stages one 204 and two 208. Such processes may use or share the same hardware components and/or processing modules. Furthermore, the various stages can share hardware elements and/or processing modules. In particular, the hardware and/or processing modules used in connection with implementing the fast Walsh transform steps 212 as part of stage one 204 processing can also be used in connection with the fast Walsh transform steps 212' completed in connection with stage two 208 processing. Furthermore, as described above, various memory blocks and registers 224, 228 can be used in connection with both stage one 204 and stage two 208.

Figure 3:
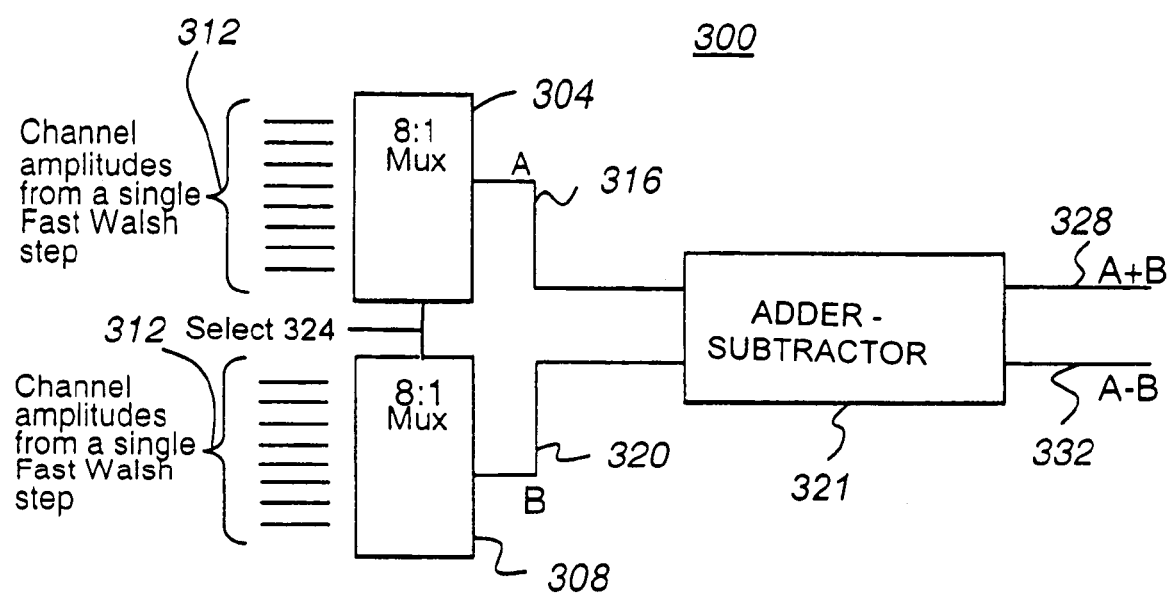
FIG. 3 is a block diagram illustrating aspects of the implementation of a fast Walsh transform in accordance with an embodiment of the present invention.

With reference now to FIG. 3, aspects of the implementation of a fast Walsh transform in accordance with an embodiment of the present invention are illustrated. In particular, FIG. 3 depicts a hardware structure or circuitry that may be used to implement a fast Walsh transform step 212, 212'. In general, the fast Walsh transform circuitry 300 includes a first multiplexer 304 and a second multiplexer 308. Each of the multiplexers 304, 308 receives as input data 312 a set of values for processing. Accordingly, where the fast Walsh transform circuit 300 is performing a first fast Walsh transform stage 212a, 212a', the set of values provided as an input 312 to the multiplexers 304, 308 comprises despread, but otherwise raw data, representing received chip amplitudes. Where the fast Walsh transform circuitry 300 implements a second or later fast Walsh transform step 212, 212', the inputs 312 comprise elements calculated during a previous fast Walsh transform step 212, 212'. Furthermore, the elements provided as inputs 312 may be modified as described herein. For example, data provided as inputs 312 to a fast Walsh transform circuit 300 implementing a fast Walsh transform step 212 included in stage one 204 may comprise actual element magnitudes and zero values for element magnitudes that were determined to be greater than or equal to the threshold value that have been changed to a value of zero and stored in memory 228. Furthermore, it should be appreciated that where a number of fast Walsh transform steps 212 have been performed on the input data such that the Walsh level corresponds to a valid minimum symbol length, the input values may comprise channel amplitudes. As a further example, data provided as inputs 312 to a fast Walsh transform circuit 300 implementing a fast Walsh transform step 212' included in stage 2 208 may comprise actual element magnitudes and zero values for element magnitudes that were determined to be less than the threshold value that were stored in a memory block (e.g., one of the memory blocks 224a-d or memory 228 for data resulting from a first fast Walsh transform step 212 in stage one 204).

A single element from each of the multiplexers 304, 308 is provided at a corresponding output 316 or 320 in response to a select signal 324. In general, the select signal 324 is generated by the channel estimation/interference vector generation module 140, or by some other modular aspect of the cancellation controller 128, to provide the proper pair of elements at the outputs 316, 320. The outputs 316, 320 of the multiplexers 304, 308 are provided to an adder—subtractor 324. The adder—subtractor comprises an adder that provides a first output 328 comprising a value resulting from the addition of the value output by the first multiplexer 304 on output line 316, and the value output by the second multiplexer 308 on input line 320. The adder—subtractor 324 additionally includes a subtractor that provides as an output the subtraction of the value provided by the second multiplexer 308 from the value provided by the first multiplexer 308 on second output line 332.

In accordance with an embodiment for use in connection with a communication system having a maximum symbol length of 64 chips, four fast Walsh transform circuits 300 may be used to obtain a complete set of 64 transform values. The results of the addition and subtraction operations available at the outputs 328, 332 may then be further processed by additional fast Walsh transform steps, and/or compared to a threshold as described elsewhere herein.

Figure 4:
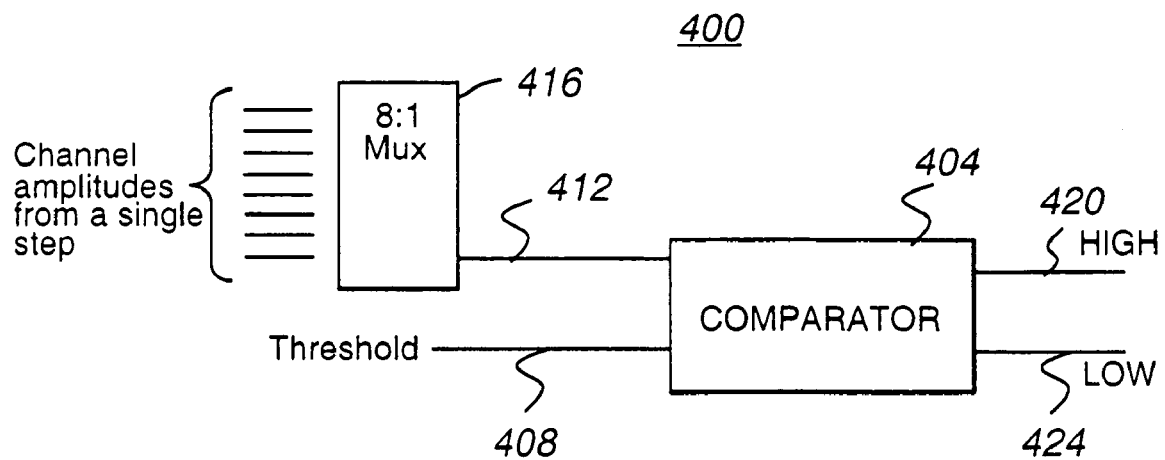
FIG. 4 is a block diagram illustrating aspects of the implementation of a threshold comparison function in accordance with an embodiment of the present invention.

With reference now to FIG. 4, components of a comparison circuit 400 are illustrated. In general, the comparison circuit 400 may be used in connection with the comparison steps 220. The comparison circuit 400 may include a comparator 404 having as a first input a threshold 408 and an element value or channel amplitude 412. A selected element value or channel amplitude may be provided from a multiplexer 416. The comparator 404 has a high output 420 and a low output 424. If the element value under consideration is less than the threshold, for purposes of providing transform element values for a next fast Walsh transform step 212, the high output 420 is set to zero and the low output is set to the channel amplitude. Furthermore, for purposes of storing channel amplitudes in memory 224 for determination of an interference vector 228, if the channel amplitude is greater than or equal to the threshold, the high output 420 is set to the channel amplitude and the low output 424 is set to zero.

Figure 5:
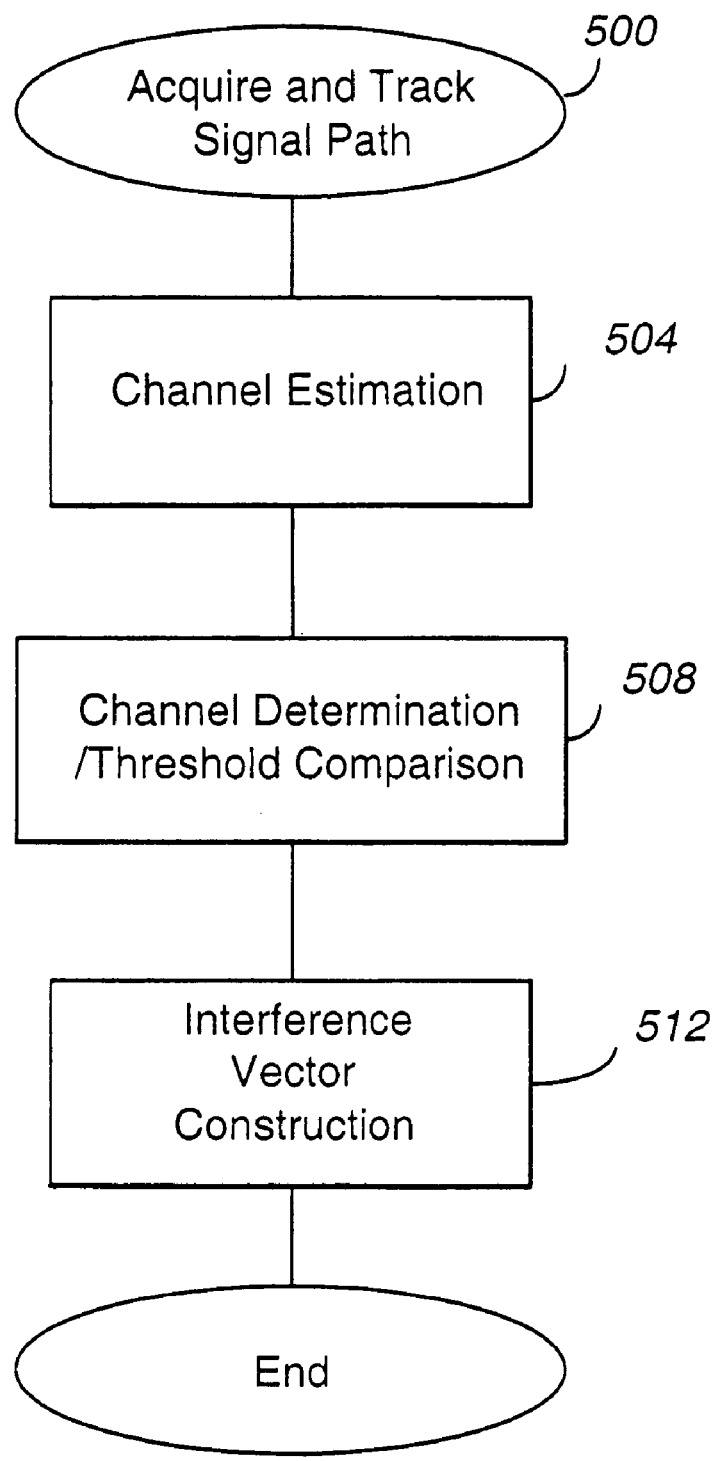
FIG. 5 is a flowchart illustrating aspects of the operation of an embodiment of the present invention.

With reference now to FIG. 5, aspects of the operation of an embodiment of the present invention are illustrated. Initially, at step 500, a signal path identified as an interfering or potentially interfering signal path is acquired and tracked. At step 504, channel estimation is performed, during which the amplitude of channels that may be present in the track signal path are determined. As can be appreciated by one of skill in the art, the signal path comprises a linear combination of channels that may have been transmitted at multiple rates. For example, a CDMA 2000 signal may contain channels having a symbol duration varying in length from four chips to 128 chips, and the identity and length of the symbols in the channels present would depend on what was transmitted by the transmitter at the base station or mobile station during the time of interest.

Following channel estimation, channel determination and threshold comparison is performed (step 508). Channel determination and threshold comparison 508 includes determining whether a particular channel is actually present in the signal paths. As described herein, channel determination includes a step of comparing a received magnitude for a channel with a threshold value. Various algorithms may be used for determining the threshold. A channel that is known to be always present in a signal path, as provided by the applicable standards, is usually chosen for determining the threshold. For example, in a CDMA 2000 receiver, the average magnitude of the synchronization channel (averaged over an arbitrary number of symbols) may be used to determine the threshold.

According to the present invention, following channel determination, interference vector construction is performed (step 512). Furthermore, the present invention provides for the construction of a composite interference vector. The composite interference vector may be constructed as described in U.S. Provisional Patent Application No. 60/331,480, entitled "Construction of an Interference Matrix for a Coded Signal Processing Engine," filed Nov. 16, 2001, the entire disclosure of which is incorporated herein by reference.

Figure 6:
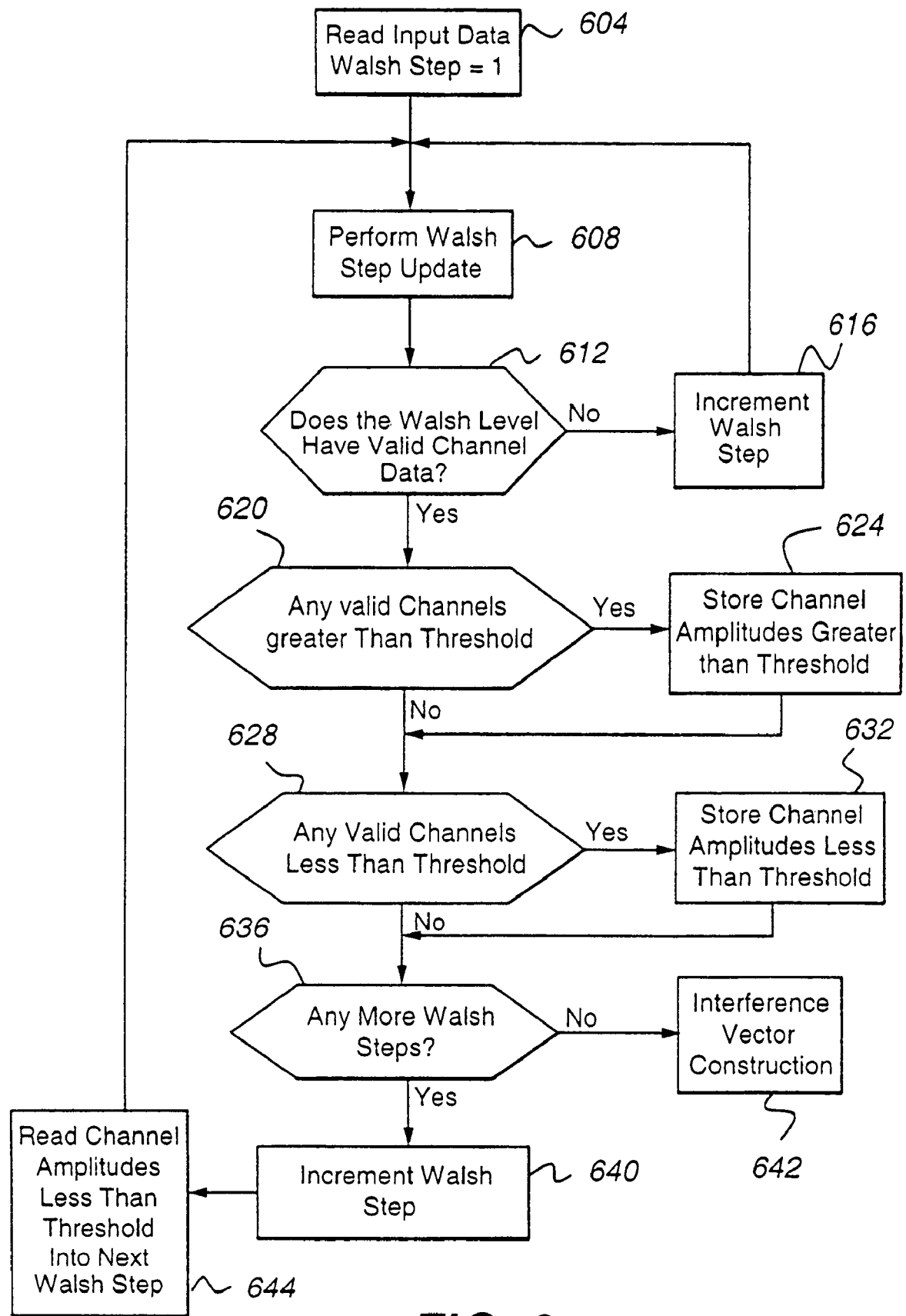
FIG. 6 is a flowchart illustrating additional aspects of the operation of an embodiment of the present invention.

With reference now to FIG. 6, additional aspects of the operation of an embodiment of the present invention are illustrated. Initially, at step 600, input data is read into Walsh step one 212a (step 604). In general, the input data read into Walsh step one comprises a set of magnitudes. Furthermore, the step of magnitudes contains a number of elements equal to the number of chips in a longest valid symbol for the communication system in connection with which the present invention is being deployed. A Walsh update step is then performed on the input data (step 608). That is, a first fast Walsh transform step is performed. At step 612, a determination is made as to whether the Walsh level of the preceding Walsh update step includes valid channel data. For example, because log N fast Walsh transform steps must be performed in order to determine the channels that are present in a signal path having a symbol length equal to N chips, not all Walsh levels will contain valid channel data. Furthermore, because communication systems may define valid symbol lengths that are separated by one or more Walsh levels, Walsh levels for symbol lengths greater than a minimum valid symbol length may not contain valid channel data. For example, a communication system may define symbols of chip length 4 and 64 as valid, but intermediate symbol lengths (e.g., symbol lengths 8, 16 and 32) as invalid. If it is determined that the current Walsh level does not have valid channel data, the Walsh step is incremented (step 616) and the process returns to step 608.

If the Walsh level under consideration does have valid channel data, a determination is next made as to whether the magnitude of any valid channel (i.e., the magnitudes of any of the elements in the set under consideration) is greater than a threshold value (step 620). If any valid channel is determined to have a magnitude greater than the threshold, those channel magnitudes or amplitudes are stored (step 624). After storing channel amplitudes greater than the threshold (step 624), or after determining that no valid channels are greater than the threshold, a determination is made as to whether any valid channels have a magnitude that is less than the threshold (step 628). The magnitude of any valid channels that is less than the threshold is stored (step 632). After storing the amplitudes of any channels that are less than the threshold, or after determining that there are no valid channels with a magnitude that is less than the threshold, a determination is made as to whether there are any more Walsh steps to be performed (636). In general, the total number of Walsh steps to be performed is determined by the maximum valid symbol length used in connection with the applicable communication system. For example, for a communication system in which a maximum valid symbol length is 64 chips, 6 fast Walsh transform steps must be performed to complete channel determination. Accordingly, if Walsh steps remain to be performed, the Walsh step is incremented (step 640). The channel amplitudes that are less than the threshold are then read into the next Walsh step (step 644) and the process returns to step 608. As can be appreciated from the description provided herein, the magnitude of channels that were determined to exceed the threshold may be set to zero at step 644 in connection with the next fast Walsh transform step. If no more Walsh transform steps remain to be performed, the system proceeds to interference vector construction (step 640) (see FIG. 7).

Figure 7:
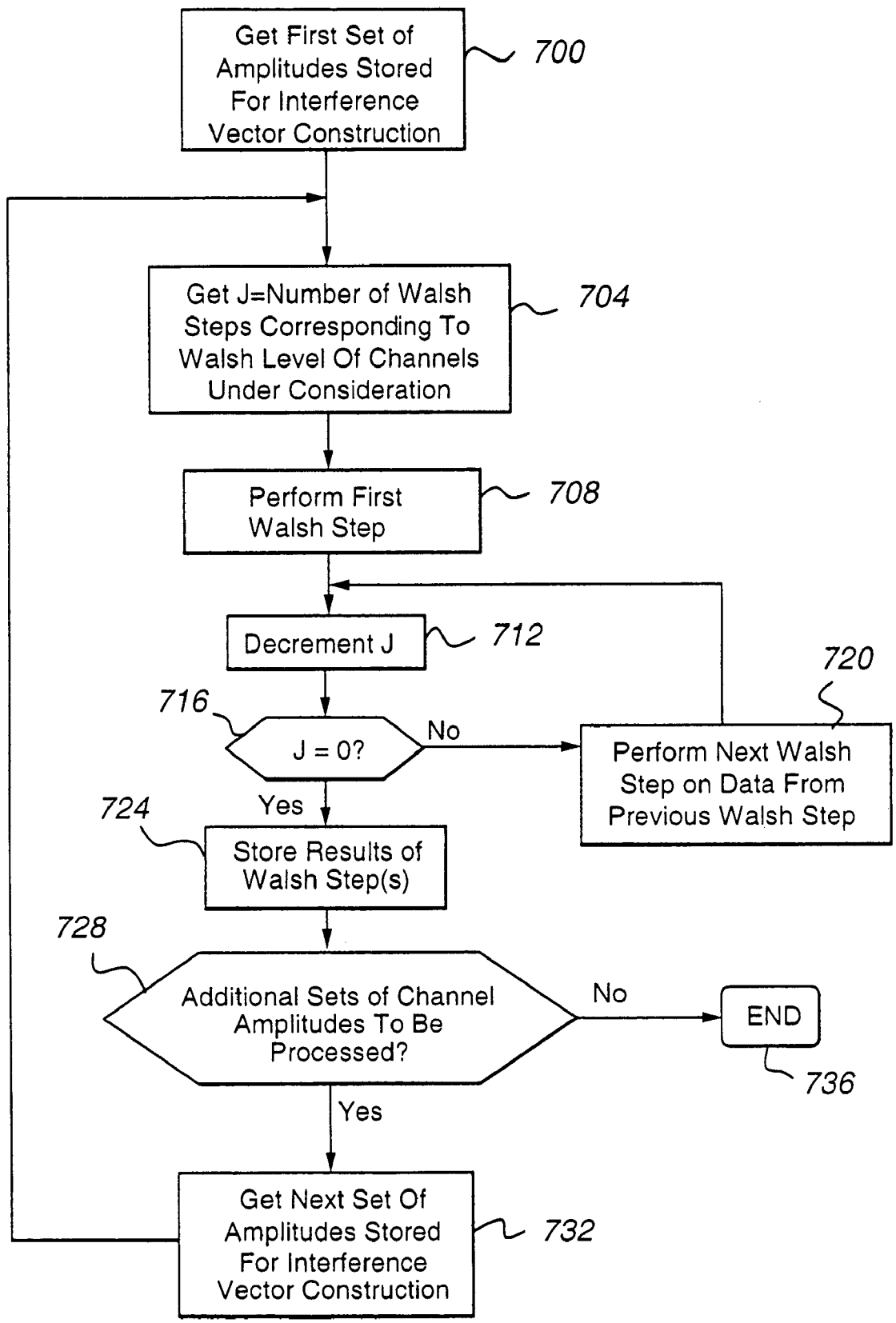
FIG. 7 is a flowchart illustrating aspects of the construction of an interference vector in accordance with an embodiment of the present invention.

With reference now to FIG. 7, steps taken in connection with the generation of interference vectors in accordance with an embodiment of the present invention are illustrated. Initially, at step 700, a first set of amplitudes stored for interference vector construction are obtained. For example, the set of amplitudes stored in the first memory 224a are obtained. As described elsewhere herein, the amplitudes stored in the first memory 224a may include actual amplitude values or those amplitudes found to be equal to or greater than a threshold, and a zero value for those amplitudes that were earlier found to be less than the threshold. At step 704, a count value j is set equal to the number of Walsh steps corresponding to the Walsh level of the channels under consideration. For example, where the values stored in the first memory 224a have been processed by two fast Walsh transform steps 212a and 212b, j is set equal to two. Accordingly, j=Log n, where n is the symbol length for the stored values (i.e., the channel amplitudes). A first Walsh transform step is then performed on the channel amplitudes (step 708). The counter j is then decremented (step 712), and a determination is made as to whether j is equal to zero (step 716). If j is not equal to zero, a next Walsh step is performed on the data obtained as a result of performing the previous Walsh step (step 720). The process then returns to step 712.

If at step 716 it is determined that j is equal to zero, the results of the Walsh step or steps that were performed on the channel amplitudes under consideration are stored (step 724). For example, the results may be stored in a memory block as an interference vector 232. At step 728, a determination is made as to whether additional sets of channel amplitudes remain to be processed. If remaining sets of channel amplitudes remain to be processed, the next set of amplitudes stored for interference vector construction is obtained (step 732) and the process returns to step 704. If no additional sets of channel amplitudes remain to be processed, the process ends (step 736).

Figure 8:
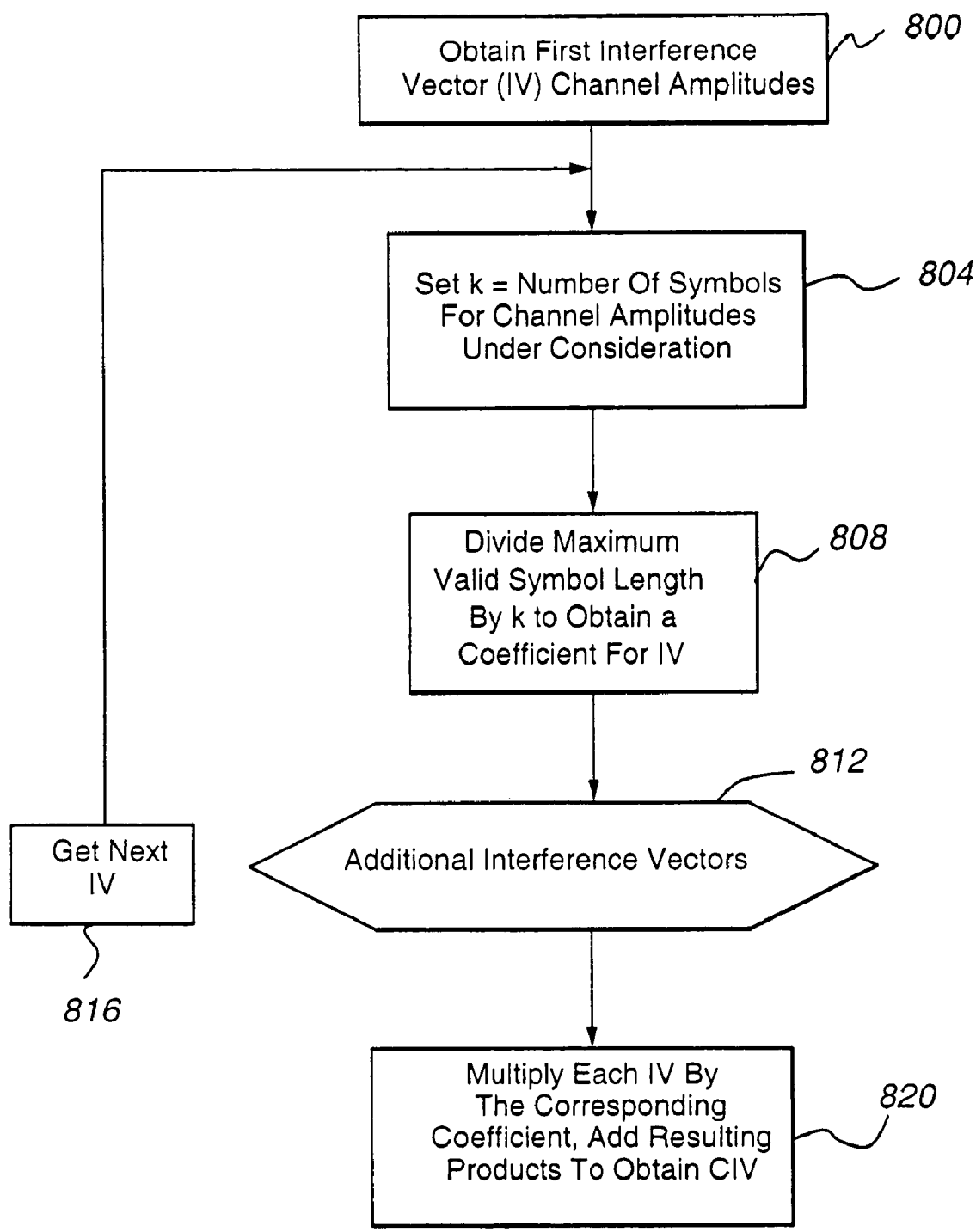
FIG. 8 illustrates aspects of a process for creating a composite interference vector in accordance with an embodiment of the present invention.

With reference now to FIG. 8, a process for constructing a composite interference vector 216 in accordance with an embodiment of the present invention is illustrated. Initially, a first set of channel amplitudes comprising a first interference vector 232 is obtained (step 800). At step 804, a counter k is set equal to a number of symbols included in any valid channels that the corresponding Walsh level for the channel amplitudes under consideration. For example, where the channel amplitudes under consideration correspond to channels having a minimum symbol length of four chips, k is set equal to four. As another example, where the channel amplitudes under consideration correspond to channels having a symbol length of 64 chips, k is set equal to 64. At step 808, the maximum valid symbol length is divided by k to obtain a coefficient for the interference vector under consideration.

At step 812, a determination is made as to whether there are additional interference vectors for which a coefficient remains to be calculated. If there are additional interference vectors, the next interference vector is obtained (step 816) and the process returns to step 804. If a coefficient has been calculated for all of the interference vectors, each interference vector is multiplied by the corresponding coefficient, and the resulting products are added to obtain a composite interference vector (step 820). The composite interference vector may then be applied to a signal stream, to create an interference cancel signal stream.

As can be appreciated by one of skill in the art, the various comparison steps generally result in a selected one of two possible events occurring. At various points in the description, a first action is described as being taken if a value under consideration is equal to or greater than a threshold value, and a second action is taken if the value under consideration is less than the threshold value. However, as a matter of design choice, the first event could be taken if the value under consideration is found to be greater than the threshold, and the second event could be taken if the value under consideration is found to be less than or equal to the threshold. That is, either a first or a second result is obtained from the comparison, which determines an action or event to be taken with respect to the element, if any.

Although the description provided herein has discussed exemplary communication systems having a maximum symbol length of 64 chips and a minimum symbol length of 4 chips, it should be appreciated that the present invention is not limited to use with such systems. In particular, the present invention may be applied to any spread spectrum communication system for which channel estimation is desired. For example, a communication system that supported symbol lengths of up to 128 chips could be accommodated by an additional fast Walsh transform step and an additional memory register. Furthermore, the present invention may be applied to any communication system for which the generation of interference vectors and/or a composite interference vector for interference cancellation purposes is desired.

As can be appreciated by one of skill in the art, aspects of the present invention may be implemented in various forms. For instance, the present invention may be implemented by hard or soft programming code running on a suitable processor having access to memory. Furthermore, the present invention may be implemented as an application specific integrated circuit (ASIC), or a field programmable gate array (FPGA). Furthermore, aspects of the present invention may be implemented using hard coded or dedicated logic circuits. For example, as described herein, multiplexers, adders, subtractors, comparators, memory and/or memory registers may be implemented in accordance with the present invention using discrete and/or integrated circuit components.

In addition, the present invention is not limited to voice communication systems. For example, embodiments of the present invention may be applied to any multiple channel system, including radio locating systems, such as the global positioning system (GPS), multi-media communications, and data transmission systems.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for signal processing comprising:
performing a first fast Walsh transform on a first set of magnitudes to obtain a result;
modifying the said result to obtain a first modified result;
performing at least a second fast Walsh transform on the said first modified result to obtain a second modified result;
where modifying the said result comprises:
storing a result of said performing a first fast Walsh transform in a first register;
comparing each magnitude comprising said result of performing said at least a first fast Walsh transform to a threshold value; and
replacing each magnitude of said stored result of performing said first fast Walsh transform that is greater than said threshold value with a zero to obtain the first modified result.

2. An apparatus for interference cancellation, comprising:
means for receiving a signal;
means for despreading the received signal;
means for performing carrier phase recovery on the despread signal;
means for performing at least a first fast Walsh transform on the despread carrier phase recovered signal to obtain a first set of transformed values;
means for modifying the said first set of transformed values to create a first modified set of values; and
means for performing at least a second fast Walsh transform on said first modified set of values to create a second modified set of values, further comprising:
means for storing an interference vector precursor, wherein said interference vector precursor includes an element amplitude for an element having an amplitude that exceeds a threshold and a zero for an element having an amplitude that does not exceed said threshold.

3. The apparatus of claim 2, further comprising:
means for performing at least a first fast Walsh transform on said interference vector precursor to obtain an interference vector.

4. The apparatus of claim 3, further comprising:
means for storing said interference vector.

5. The apparatus of claim 3, further comprising:
means for scaling said interference vector.

6. The apparatus of claim 5, further comprising means for combining a plurality of interference vectors to form a composite interference vector.

7. A receiver device, comprising:
a despreader operable to despread a received signal to produce a despread signal;
a carrier phase recovery module coupled to the despreader;
a fast Walsh transform module operable to perform a selected fast Walsh transform stage on the output of the carrier phase recovery module;
a comparator operable to compare each value output from said fast Walsh transform module to a threshold;
a first memory register operable to store element values output from said comparator as having a value less than said threshold; and
a second memory register operable to store element values output from said comparator as having a value not less than said threshold.

8. The device of claim 7, wherein said comparator is additionally operable to output a zero for storing in said first memory register in place of element values having a value greater than said threshold.

9. The device of claim 7, wherein said comparator is additionally operable to output a zero for storing in said second memory register in place of element values having a value less than said threshold.

10. The device of claim 7, further comprising:
a multiplexer operable to provide said element values stored in said second memory to said fast Walsh transform module, said fast Walsh transform module additionally being operable to perform at least a first fast Walsh transform on said stored element values to obtain an interference vector.

11. The device of claim 10, further comprising:
a scaler operable to multiply said interference vector by a selected value.

12. The device of claim 11, further comprising a summer operable to add a plurality of scaled interference vectors to obtain a composite interference vector.

13. A method implemented in a logic circuit configured for:
performing carrier phase recovery on and despreading a received signal to obtain a first set of magnitudes;
performing at least a first fast Walsh transform on said first set of magnitudes, wherein said set of magnitudes contains a number of magnitudes that is equal to a number of chips in a longest valid symbol;
storing a result of said performing at least a first fast Walsh transform in a first register;
comparing each magnitude comprising said result of performing said at least a first fast Walsh transform to a threshold value; and storing each magnitude of said stored result of performing said first fast Walsh transform that is greater than said threshold value to obtain a first modified result, further configured for:
storing each magnitude comprising said result of performing an $n^{th}$ fast Walsh transform having a magnitude that is not less than said threshold value in a second register; and
storing a zero for magnitudes comprising said result of performing said $n^{th}$ fast Walsh transform having a magnitude that is less than said threshold value in said second register, wherein said second register comprises a number of magnitudes that is equal to said number of chips in a longest valid symbol, and wherein n is a number of fast Walsh transforms performed.

14. The method of claim 13, wherein said storing a zero comprises replacing magnitudes stored in said second register having a magnitude that is not greater than said threshold value with a zero.

15. The method of claim 13, wherein said $n^{th}$ fast Walsh transform corresponds to a Walsh code set for symbols of a valid length.

16. The method of claim 13, further configured for:
storing said magnitude comprising said result of performing an $(n-1)^{th}$ fast Walsh transform having a magnitude that is greater than said threshold value in a third register; and
storing a zero for magnitudes comprising said result of performing said $(n-1)^{th}$ fast Walsh transform having a magnitude that is not greater than said threshold value in said third register, wherein said third register comprises a number of magnitudes that is equal to said number of chips in a longest valid symbol.

17. The method of claim 16, wherein said $(n-1)^{th}$ fast Walsh transform corresponds to a Walsh code set for symbols of at least a minimum valid length.

18. The method of claim 13, wherein said second register comprises a number of values equal to said number of chips in a longest valid symbol.

19. The method of claim 16, further configured for:
adding said value in said second register to a product equal to said value in said third register multiplied by 2 to obtain a composite interference vector.

20. The method of claim 19, wherein said $n^{th}$ fast Walsh transform corresponds to a Walsh code set for symbols of a maximum valid length.

21. The method of claim 19, further configured for:
applying said composite interference vector to a received signal stream to create an interference canceled signal stream.

* * * * *